April 7, 1970  D. ROSTOKER  3,505,089
METHOD OF MAKING PRESSED FOAM GLASSY PELLET BODIES
Filed Dec. 9, 1966

NATURAL FELSIC ROCK
↓
SILICON CARBIDE
SODIUM SULFATE → MIXING
↓
WATER → PELLETIZING
↓
WOLLASTONITE → FIRING
↓
PRESSING
↓
ANNEALING
↓
FOAMED CELLULAR
REFRACTORY BODY

INVENTOR.
DAVID ROSTOKER
BY
*Bernard K. Adam*
ATTORNEY

United States Patent Office 3,505,089
Patented Apr. 7, 1970

3,505,089
METHOD OF MAKING PRESSED FOAM GLASSY PELLET BODIES
David Rostoker, Painted Post, N.Y., assignor to Corning Glass Works, Corning, N.Y., a corporation of New York
Filed Dec. 9, 1966, Ser. No. 600,536
Int. Cl. C04b 35/16
U.S. Cl. 106—40                                      7 Claims

ABSTRACT OF THE DISCLOSURE

A method of making a foamed refractory body from particulate natural felsic igneous and metamorphic rocks by intimately mixing the rocks with chemically reactable foaming agents that are essentially oxygen stable below 1050° C. and reactive at the foaming temperature of the rocks to form a substantially uniform particulate mixture, pelletizing the mixture with a sufficient amount of water to form pellets, firing the pellets at a foaming temperature of 1115° to 1200° C. in the presence of a bed of a fibrous, refractory, anhydrous mineral material to form expanded pellets, pressing the hot expanded pellets into a foamed sintered body, and cooling and annealing the foamed body.

---

This invention relates to a method of making foam glassy pellets and the pressing of these pellets into foamed bodies. More particularly the invention relates to forming rigid foamed articles from naturally occurring mineral materials.

Foamed or cellulated refractory bodies, that is inorganic heat resistant bodies expanded by the internal development of non-connecting gas filled cells while the material is in a coalesced or fused state, are well known. Foamed glass products, having densities on the order of 0.15 to 0.30 gram/cc., have been in use for several years to provide buoyancy, light weight and thermal insulation in conjunction with resistance to heat and moisture penetration.

Such commercial products are customarily produced from premelted glass. In general, the process involves premelting a suitable glass composition, pulverizing the glass in admixture with chemically reactable gas producing agents such as a carbon reducing agent in conjunction with an oxidizing agent, depositing a thin layer of the pulverized mixture in a closed pan, heating to a foaming temperature of about 800–900° C., and then annealing over a period of several hours. The products and the process of production are technically satisfactory, but high production costs have imposed limits on areas of utility for these foamed glass products. Major economic factors are glass batch cost, separate melting and foaming operations, and mold equipment.

It has long been recognized that direct foaming of either a natural raw material or a waste slag material should provide a distinct economic advantage. Accordingly, numerous methods of foaming molten slag materials have been proposed. However, these have not been commercially adopted, except in the production of light weight aggregate for concrete mixtures. There appears to be a basic difficulty in obtaining uniform and adequate cellulation of slag material as it is obtained in the molten state.

It has been proposed, e.g., in United States Patents No. 2,485,724 and No. 2,611,712 to directly foam either unmelted glass batch or natural minerals. Such direct foaming would avoid the premelting step. In spite of the readily apparent economic advantage, these proposals have not been commercially adopted. It has proven difficult to uniformly cellulate unmelted glass batch due to occurrence of batch reactions and segregation during the foaming process. Use of a natural mineral can obviate these problems, but requires cellulating temperatures on the order of 200–500° C. higher. At such temperatures the carbon reducing agents heretofore conventionally employed to foam premelted glass, do not provide adequate cellulation.

The addition of fluxes to the natural minerals and glasses has been proposed to attain foaming temperatures around 900° C. and viscosities approximating the commercial premelted glasses. However, such flux additions minimize the economic advantage. They also tend to involve separate chemical reactions and other problems encountered with unmelted glass batch. Thus, the apparent economic advantage of natural mineral materials in the formation of cellulated products has not been achieved due to the need for a successful method of cellulation.

It is therefore an object of the present invention to provide an inexpensive method of producing cellulated refractory bodies from natural mineral materials.

Another object of the present invention is to provide a method of making foamed pellets from natural mineral materials which can subsequently be formed into light weight articles.

In accordance with the present invention, I have discovered an improved method of making foamed refractory bodies from particulate natural felsic rocks by intimately mixing the rocks with chemically reactable foaming agents that are substantially oxygen stable below and reactive at the foaming temperature of the rocks to give a substantially uniform particulate mixture, pelletizing the mixture with a sufficient amount of water to form pellets, and firing the pellets at the foaming temperature of 1115 to 1200° C. in the presence of a fiber ground wollastonite bed. The foamed pellets may then be used to form sintered bodies by preferably allowing the still hot pellets to drop from the firing kiln into a mold and pressing the mass into a cohesive self-bonding body which is thereafter subjected to conventional annealing.

The accompanying drawing, which is a flow sheet of the novel process, while not intended as a definition essentially illustrates the invention. The drawing shows the novel method of making foamed cellular refractory bodies from natural felsic rocks and chemical foaming agents. A full discussion is set forth hereinbelow.

The natural mineral material used in the present invention are broadly defined as felsic igneous or metamorphic rocks containing predominantly quartz and feldspar. This includes the rocks classified under the families of granites, rhyolites, andesites, granodiorites, syenites, monzonites, anorthosites, pegmatites, and gneisses. Particularly effective mineral components of these rocks are orthoclase feldspar, $K(AlSi_3O_8)$, and plagioclase feldspar, $Na(AlSi_3O_8)$ and $Ca(Al_2Si_2O_8)$. In addition felsic rocks containing high quantities, up to about 30%, of other natural silicates such as mica can be used. As a general requirement, there must be sufficient mineral present to yield a glassy matrix for the suspension or dispersion of any undissolved crystalline material present after fusion of the glassy phase. For successful cellulation or foaming the material should coalesce or fuse to a viscous mass or suspension having a viscosity of about $10^5$–$10^7$ poises.

A particular feature of the present method is the combination of gas producing or foaming agents, that is the agents which chemically react to provide the requisite gas for foaming. To be suitable, these reactants must be stable and relatively unreactive at temperatures below the cellulating range, that is at temperatures below that at which the material being cellulated attains a viscosity of about $10^7$ poises. Within the cellulation range, that is within the temperature range of 1115°–1200° C. and corresponding to viscosities of $10^7$ to $10^5$ poises, the materials should react relatively rapidly.

The various forms of carbon and carbonaceous materials conventionally employed as a reducing reagent have been found to be unsuitable because of a tendency to burn out, or otherwise become ineffective, at temperatures above about 900° C. In accordance with the present invention, a reducing agent that is essentially oxygen stable to a temperature of about 1100° C. is employed in conjunction with an alkaline sulfate as an oxidizing agent. Reducing agents found to have the requisite stability are finely divided metal carbides and metal sulfides. The preferred agents, in these groups respectively, are silicon carbide (SiC) and iron sulfide (FeS). Any of the alkali metal or alkaline earth sulfates may be employed as the oxidizing agent. However, sodium sulfate ($Na_2SO_4$) is preferred because it has proven particularly effective and is economical.

The density of the cellulated product will depend, among other factors, on the amount of gas-producing agents available to react. In general, at least 1.5% SiC, or an equivalent amount of other reducing agent, and 2.0% $Na_2SO_4$, or an equivalent amount of other alkaline sulfate is required to provide a density of 0.30–0.40 gram/cc. in a product cellulated under optimum conditions. Larger amounts, in excess of 3.0% SiC and 6% $Na_2SO_4$, may be employed but are generally unnecessary and uneconomical. Also, excess amounts may result in rapid, voluminous foaming that is difficult to control. An amount of either reactant below the indicated minimum will normally result in a higher density product.

The natural mineral material is dry mixed with the foaming agent and finely ground as by ball milling which provides a highly intimate mixture. This facilitates uniform cellulation. When the mineral material and/or the additives are initially in finely divided particulate form, no additional grinding may be required. The powders may be then mixed by conventional means.

The ground and mixed batch is then placed in a standard pelletizing unit. Water in an amount of about 7 to 15% by weight of the batch then is added to the pelletizing unit. The batch and water are mixed together on a slanted rotating table. As the batch and water are mixed, the batch rolls into pellets which when in a predetermined size range of 1/16 of an inch to 1/2 inch roll from the pelletizer into a trough from which they fall into a suitable receptacle. The pellets may thereafter be strengthened by calcining at temperatures up to about 500° C.

The pellets are then placed directly by a chute into a preheated rotary kiln. Quite uniquely, the kiln must contain a bed of fibrous, refractory and anhydrous mineral material, such as wollastonite to prevent the pellets from sticking together and furthermore to prevent them from sticking to the surfaces of the kiln. The pellets reside in the kiln at a temperature of from 1115° to 1200° C. for a sufficient period of time in order to achieve proper expansion, typically from about 8 to 15 minutes. By the continuous rolling or rotating of the kiln the pellets are foamed in a substantially spherical shape.

In order to provide a firing bed in the kiln, a separating agent is required that is in the form of a refractory under the operating conditions and will not contaminate or react with the pellets during heating or subsequent molding. This material must be fibrous, refractory and anhydrous. A particularly suitable agent is wollastonite which has a strongly accicular habit and as such can be blown through the upper portion of the kiln by the flame at the base. In a specially designed kiln, a portion of the wollastonite bed may be blown up through the flue and subsequently recirculated together with unexpandable pellets at the feed point. It was found that the use of talc or many other platy or fibrous mineral products as a separating agent is unsatisfactory due to their tendency to dewater at the high firing temperatures. Also asbestos minerals do not work for this purpose, and even crocidolite and amosite which have low water contents have, however, still sufficient water of hydration to cause some deleterious effects. Other refractory, nonreactive, fibrous, anhydrous minerals considered for use as a refractory bed include certain members of the amphibole group known as actinolite, anthophyllite and tremolite. Of these the first two have appreciable iron contents which cause reaction with the pellets and, while, the tremolite has been found to work it is not as good as the wollastonite.

The fully expanded pellets, which are substantially spherical in shape, have a density of about 0.3 to 1.0 gram/cc. with a vitreous surface skin and a body of closed multicells. These expanded pellets are freed from the wollastonite bed by the kiln flame and may be used immediately in the pressing operation. The pressing should proceed rapidly since the optimum pressing temperatures is also approximately the same as the firing temperatures of the pellets and thus in an efficient operation there would be a minimum amount of heat loss. The pellets may be dropped directly from the kiln into a hot female die and pressed into simple straight shaped bodies. The molding pressure is typically at 10 to 50 p.s.i.

Thereafter the molded body is rapidly annealed under standard conditions which can be routinely determined by a person skilled in the art to yield a light weight body with a glazed surface formed from the contact with the die platens of the mold.

My invention is further illustrated by the following examples.

EXAMPLE I

The following raw batch materials in powder form were intimately mixed: eighty-eight parts by weight of granite gneiss, from Barin, Ga., having a grain size of sub 50 mesh and composed by volume of 50–60% andesine feldspar, 20% biotite, 15–25% quartz, and the balance about 10% accessory ferromagnesian minerals; six parts by weight of sodium sulfate; and six parts by weight of silicon carbide-granite, a waste product from granite finishing operations, having a grain size of sub 600 mesh and composed by volume of 50% silicon carbide and 50% mixed granitoid minerals.

The substantially uniformly mixed powdered material was pelletized in a Dravo pelletizer together with about 10% water to form spherical pellets having a diameter of about 1/8 to 1/4 inch. Thereafter, the unexpanded pellets were calcined at a temperature of up to 500° C. to harden the pellets and permit the pellets to be transported.

The pellets were then collected in a container and mixed with fiber ground wollastonite in a ratio of about three parts by weight of pellets and one part wollastonite. The mixture was fed into a rotary kiln and fired at 1115° C. The residence time of the pellets in the kiln was approximately ten minutes and they were discharged from the kiln as integral expanded pellets with a very small amount of wollastonite adhering to their surface. It was observed that most of the wollastonite was either blown back up the kiln or up the kiln flue where it was exhausted into the air. The pellets after expansion had a specific gravity ranging from between 0.8 to 0.9 and had expanded to a diameter of 1/4 to 1/2 inch.

The expanded pellets were subsequently reheated to 1115° C. and hand pressed under 30 p.s.i. to an integral body in the form of a sheet having the dimensions 5″ x 5″ x 1″. The body was then cooled rapidly to 900° C. and thereafter annealed according to standard practice by cooling overnight. The pressed body exhibited a specific gravity of around 1.0 and exhibited a strength as determined by MOR of 1000 p.s.i.

EXAMPLE II

Using the unexpanded pellets prepared as in Example I, talc (hydrous magnesium silicate) was substituted for the wollastonite in the firing operation. The talc not only allowed the pellets to agglomerate, it came out of the kiln discharge vent in lumps which inhibited proper pressing. Talc dewaters completely at about the firing temperature and the resulting dehydrated material bonded to the pellets and to itself. This experiment indicates that talc cannot be substituted for wollastonite in the process of the present invention.

EXAMPLE III

A quantity of tailings (ninety-two parts by weight) from the porphyry copper deposit at Bingham Canyon, Utah, of grain size sub 200 mesh and composed by volume of microcline feldspar 45%, labradorite feldspar 5–10%, muscovite 5%, biotite 5–10%, and quartz 38%, was mixed with four parts by weight of sodium sulfate and four parts by weight of silicon carbide-granite previously described.

The material was pelletized as in Example I, but not mixed with wollastonite. Prior to the addition of the pellets to the rotary kiln, a bed of wollastonite of three to four inch thickness was emplaced therein. An effort was made to redirect the wollastonite through the flue back into the kiln. This was not entirely successful but feasibility was demonstrated. In order to make up for the loss of wollastonite from the bed, material was added throughout the run. This run was conducted at 1160° C. and the resultant pellets exhibited a specific gravity of 0.4 to 0.5.

I claim:

1. An improved method of making a foamed refractory body comprising the steps of:
   (a) intimately mixing a particulate natural material selected from the group consisting of granites, rhyolites, andesites, granodiorites, syenites, monzonites, anorthosites, pegmatites, gneisses, and mixtures thereof with chemically reactable foaming agents, that are substantially oxygen stable below 1050° C. and reactive at the foaming temperature of said material to form a substantially uniform particulate mixture,
   (b) pelletizing said mixture with a sufficient amount of water to form pellets,
   (c) firing said pellets at a foaming temperature of 1115°–1200° C. in the presence of a bed of a fibrous, refractory, anhydrous mineral material to form expanded pellets,
   (d) pressing the hot expanded pellets into a foamed self-sintered body, and
   (e) cooling and annealing the foamed body.

2. The method of claim 1, wherein said anhydrous mineral material is wollastonite.

3. The method of claim 1, wherein said rocks are granite gneiss.

4. The method of claim 1, wherein the foaming agents include, as an oxidizing agent, an alkaline sulfate in amount equivalent to 2.0–6.0% of sodium sulfate.

5. The method of claim 1, wherein the foaming agents include, as a reducing agent, a metal carbide in an amount equivalent to 1.5–3.0% of silicon carbide.

6. The method of claim 1, wherein the foaming agents include, as reducing agents, a metal sulfide in an amount equivalent to 1.5–3.0% of silicon carbide.

7. The method of making the pellets of claim 2, comprising intimately mixing said rocks with chemically reactable foaming agents, that are substantially oxygen stable below and reactive at the foaming temperature of said rocks, to form a substantially uniform particulate mixture, pelletizing said mixture and firing said pellets at a foaming temperature of 1115–1200° C. in the presence of a fiber ground wollastonite bed.

References Cited

UNITED STATES PATENTS

| | | | |
|---|---|---|---|
| 2,478,757 | 8/1949 | Foster | 106—40 X |
| 2,485,724 | 10/1949 | Ford | 106—40 X |
| 3,174,870 | 3/1965 | Connelly et al. | 106—40 |
| 3,189,512 | 6/1965 | Stong | 106—40 X |
| 3,199,992 | 8/1965 | Moffitt | 106—40 X |
| 3,207,588 | 9/1965 | Slayter et al. | 106—40 X |
| 3,325,341 | 6/1967 | Shannon | 106—40 X |
| 3,331,694 | 7/1967 | Heidrich et al. | 106—40 |

HELEN M. McCARTHY, Primary Examiner

W. R. SATTERFIELD, Assistant Examiner

U.S. Cl. X.R.

65—22; 252—378